US011279036B2

(12) United States Patent
Thackston et al.

(10) Patent No.: US 11,279,036 B2
(45) Date of Patent: Mar. 22, 2022

(54) METHODS AND SYSTEMS FOR IMPLEMENTING CUSTOMIZED MOTIONS BASED ON INDIVIDUAL PROFILES FOR IDENTIFIED USERS

(71) Applicant: Toyota Research Institute, Inc., Los Altos, CA (US)

(72) Inventors: Allison Thackston, San Jose, CA (US); Samuel Zapolsky, San Francisco, CA (US); Katarina Bouma, Palo Alto, CA (US); Laura Stelzner, Mountain View, CA (US); Ron Goldman, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 165 days.

(21) Appl. No.: 16/148,343

(22) Filed: Oct. 1, 2018

(65) Prior Publication Data
US 2020/0101614 A1    Apr. 2, 2020

(51) Int. Cl.
*B25J 9/16*     (2006.01)
*B25J 13/00*    (2006.01)
*B25J 19/02*    (2006.01)

(52) U.S. Cl.
CPC .......... *B25J 9/1689* (2013.01); *B25J 13/006* (2013.01); *B25J 9/1679* (2013.01); *B25J 19/023* (2013.01)

(58) Field of Classification Search
CPC ............................. B25J 9/1689; B25J 13/006
See application file for complete search history.

(56) References Cited

U.S. PATENT DOCUMENTS

| 8,340,816 | B2 | 12/2012 | Funada et al. |
| 8,688,306 | B1 * | 4/2014 | Nemec ............... G06K 9/00805 |
| | | | 701/25 |
| 8,751,042 | B2 | 6/2014 | Lee et al. |
| 8,996,429 | B1 | 3/2015 | Francis, Jr. et al. |
| 9,213,405 | B2 * | 12/2015 | Perez ............... H04N 21/25891 |

(Continued)

OTHER PUBLICATIONS

Abir-Beatrice Karami, Karim Sehaba & Benoit Encelle, "Adaptive and Personalised Robots—Learning from Users' Feedback," online article, Oct. 28, 2015, URL: https://hal.archivesouvertes.fr/hal-01221445/file/Adaptive-Robots-ICTAI2013.pdf.

*Primary Examiner* — Rachid Bendidi
(74) *Attorney, Agent, or Firm* — Dinsmore & Shohl LLP

(57) ABSTRACT

A teleoperation system includes a robot comprising an actuator configured to move at least a portion of the robot, and a remote computing device comprising: one or more processors, one or more sensors communicatively coupled to the one or more processors, a non-transitory memory component communicatively coupled to the one or more processors, and machine readable instructions stored in the non-transitory memory component. The remote computing device obtains information about a user proximate to the remote computing device, identifies the user based on the obtained information, obtains an action of a user, retrieves an individual profile for the user based on the identified user, determines an intended instruction related to a task based on the action of the user related to the task and the individual profile for the user, and instructs the robot to implement the task with the actuator based on the intended instruction.

18 Claims, 8 Drawing Sheets

(56) References Cited

U.S. PATENT DOCUMENTS

| | | | |
|---|---|---|---|
| 2012/0206334 A1* | 8/2012 | Osterhout | G06F 3/005 |
| | | | 345/156 |
| 2013/0035791 A1* | 2/2013 | Chiu | B25J 9/1692 |
| | | | 700/253 |
| 2014/0094968 A1* | 4/2014 | Taylor | B25J 3/04 |
| | | | 700/257 |
| 2014/0350727 A1* | 11/2014 | Desai | H04N 5/23206 |
| | | | 700/259 |
| 2015/0100157 A1 | 4/2015 | Houssin et al. | |
| 2016/0109954 A1* | 4/2016 | Harris | G06K 9/00268 |
| | | | 345/156 |
| 2016/0283465 A1 | 9/2016 | Patris et al. | |
| 2017/0027652 A1* | 2/2017 | Johnson | A61B 90/50 |

* cited by examiner

METHODS AND SYSTEMS FOR IMPLEMENTING CUSTOMIZED MOTIONS BASED ON INDIVIDUAL PROFILES FOR IDENTIFIED USERS

TECHNICAL FIELD

The present disclosure generally relates to methods and systems for controlling a robot to implement customized motions, and, more particularly to interpreting intended instructions of a user based on an individual profile for the user and implementing customized motions based on the intended instructions.

BACKGROUND

Robots may implement tasks on behalf of users. Robots may receive instructions from users and operate according to the received instructions. For example, a robot may move to a certain location in response to receiving an instruction for moving to the location from a user. As another example, a robot may move its arm in response to receiving an instruction for moving the arm from a user. A robot may interact with many users. Different users may have different intents and/or styles regarding the operations of the robot, e.g., a moving speed, an amount of force that the robot applies, a degree of accuracy in conducting a task, etc.

Accordingly, a need exists for methods and systems for interpreting the intention of a user interacting with a robot and implementing customized motions based on an individual profile for the user.

SUMMARY

In one aspect, a teleoperation system includes a robot including an actuator configured to move at least a portion of the robot; and a remote computing device. The remote computing device includes one or more processors, one or more sensors communicatively coupled to the one or more processors, a non-transitory memory component communicatively coupled to the one or more processors, and machine readable instructions stored in the non-transitory memory component. The remote computing system obtains information about a user proximate to the remote computing system with the one or more sensors, identifies the user based on the obtained information, obtains an action of the user, retrieves an individual profile for the user based on the identified user; determine an intended instruction related to a task based on the action of the user related to the task and the individual profile for the user, and instructs the robot to implement the task based on the intended instruction. The individual profile includes intent parameters related to the action of the user. In some embodiments, the remote computing device may include an output device configured to provide feedback to the user based on an operation of the device, and the remote computing device determines the feedback based on the individual profile for the user. In some embodiments, the remote computing device comprises a display configured to display a view related to the robot, and the remote computing device determines a type of the view based on the individual profile for the user.

In another aspect, a robot system is provided. The robot system includes one or more processors, one or more sensors communicatively coupled to the one or more processors, a non-transitory memory component communicatively coupled to the one or more processors, and machine readable instructions stored in the non-transitory memory component. The robot system obtains information about a user proximate to the robot system with the one or more sensors, identifies the user based on the obtained information, obtains an action of a user, retrieves an individual profile for the user based on the identified user, determines an intended instruction related to a task based on the action of the user related to the task and the individual profile for the user, and implements the task based on the intended instruction. The individual profile includes intent parameters related to the action of the user.

In yet another aspect, a method for operating a robot is provided. The method includes obtaining, with one or more sensors of a remote computing device, information about a user proximate to the remote computing device, identifying, by a controller of the remote computing device, the user based on the obtained information, obtaining, by the controller of the remote computing device, an action of the user, retrieving, by the controller of the remote computing device, an individual profile for the user based on the identified user, determining, by the controller of the remote computing device, an intended instruction related to a task based on the action of the user related to the task and the individual profile for the user, and implementing, by the controller of the remote computing device, the task based on the intended instruction. The individual profile includes intent parameters related to the action of the user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments described herein are directed to methods and systems for controlling a robot to implement customized motions. A robot may receive operation instructions from various users, and the instructions from various users need to be interpreted differently based on personal intents and/or styles of the users. Thus, the robot needs to interpret the instructions from the user to implement customized operations. Robots according to the present disclosure address the problems of conventional robots by identifying a user and interpreting the intention of the user based on an individual profile for the identified user.

The robot system includes one or more processors, one or more sensors communicatively coupled to the one or more processors, a non-transitory memory component communicatively coupled to the one or more processors, and machine readable instructions stored in the non-transitory memory component. The robot obtains information about a user proximate to the robot with the one or more sensors, identifies the user based on the obtained information, obtains an action of the user, retrieves an individual profile for the user based on the identified user; determine an intended instruction related to a task based on the action of the user related to the task and the individual profile for the user, and implements the task based on the intended instruction. The individual profile includes intent parameters related to the action of the user.

Figure 1A:
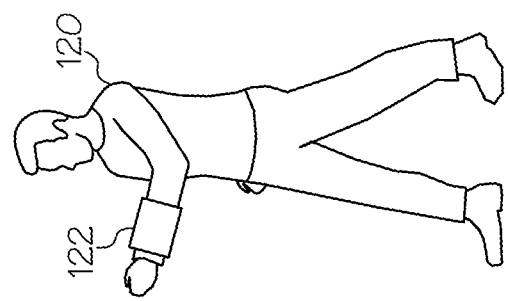
FIG. 1A schematically depicts a robot interacting with users, according to one or more embodiments described and illustrated herein.
Figure 1A:
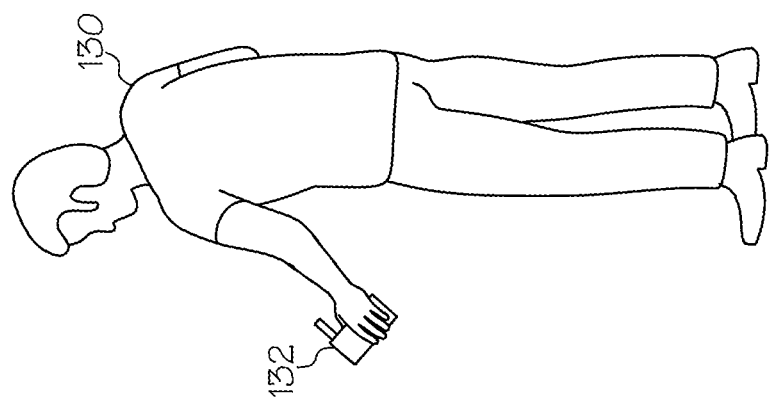
Figure 1A:
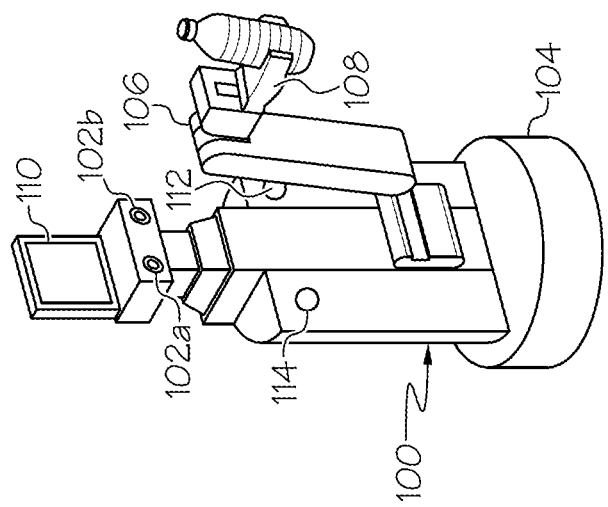

Referring now to FIG. 1A, a robot 100 interacting with one or more users is illustrated. For example, the robot 100 is interacting with user A 120 and user B 130. The robot 100, which is illustrated generically in FIG. 1A, may take on any size and configuration. For example, the robot 100 may be configured as service robot to assist humans in the home, workplace, school, or healthcare facility, such as the robot 100 illustrated in FIG. 1A. In another embodiment, the robot may be a production robot utilized within a manufacturing facility. It should be understood that the embodiments described herein are not limited to any type of robot.

The robot 100 illustrated in FIG. 1A generally comprises image capturing devices 102a, 102b, an arm 106, a gripping assembly 108, a locomotion device 104, a screen 110, and a microphone 112. The image capturing devices 102a, 102b may be configured as digital cameras capable of acquiring still image and/or digital video. In an alternative embodiment, the robot 100 may be equipped with only one image capturing device to more than two image capturing devices. The image capturing devices 102a, 102b depicted in FIG. 1A may enable the robot 100 to detect users, and recognize users, as described below.

The locomotion device 104 is utilized by the robot 100 to maneuver within an operating space 101. In the embodiment depicted in FIG. 1A, the locomotion device is tracked locomotion device. However, in other embodiments, the robot 100 may include one or more locomotive devices other than a tracked locomotive device. For example, the robot 100 may maneuver within the operating space 101 using one or more wheels or legs. In some embodiments, the robot 100 may include more than two locomotive devices. In some embodiments, the robot 100 may be an unmanned aerial vehicle, or an unmanned submersible.

The arm 106 and gripping assembly 108 may be servo-actuated in one embodiment to manipulate objects that the robot 100 encounters within the operating space. Other actuation mechanisms may be utilized, such as by pneumatic drives, hydraulic drives, electro-active polymer motors, etc. In some embodiments, the robot 100 may include only one arm and gripping assembly or more than two arms and gripping assemblies.

The screen 110 may display images, videos, texts, etc. which are visible to users proximate to the robot 100. For example, the screen 110 may display texts that describe an operation that the robot 100 is currently implementing, e.g., picking up a water bottle. As another example, the screen 110 may display the picture of a user that the robot 100 is currently interacting with. The microphone 112 may record audio external to the robot 100, e.g., voice by user A 120 or user B 130.

In some embodiments, a user may interact with the robot 100 by providing instructions using wearable devices. For example, user A 120 may wear a wearable device 122 that is communicatively coupled to the robot 100. The wearable device 122 may be any type of wearable device, e.g., a smart wrist band, a smart watch, a smart glove, etc. The wearable device 122 obtains the motion data of user A 120 and transmits the motion data to the robot 100, which will be described in detail with reference to FIG. 2 below. The robot 100 may operate based on the received motion data from user A 120. In some embodiments, user A 120 may be remotely located from the robot 100.

In some embodiments, a user may interact with the robot 100 using a user interface. For example, user B 130 holds a user interface 132 that is communicatively coupled to the robot 100. The user interface 132 may be an input device configured to receive instructions from a user for operating the robot 100. For example, the input device may be a joystick that the user can manipulate to operate the robot 100. The user may control the moving direction and speed of the robot 100 by controlling the joystick. The user interface 132 may be communicatively coupled to the robot 100 in order to send instructions to the robot 100, which will be described below with reference to FIG. 2.

Figure 1B:
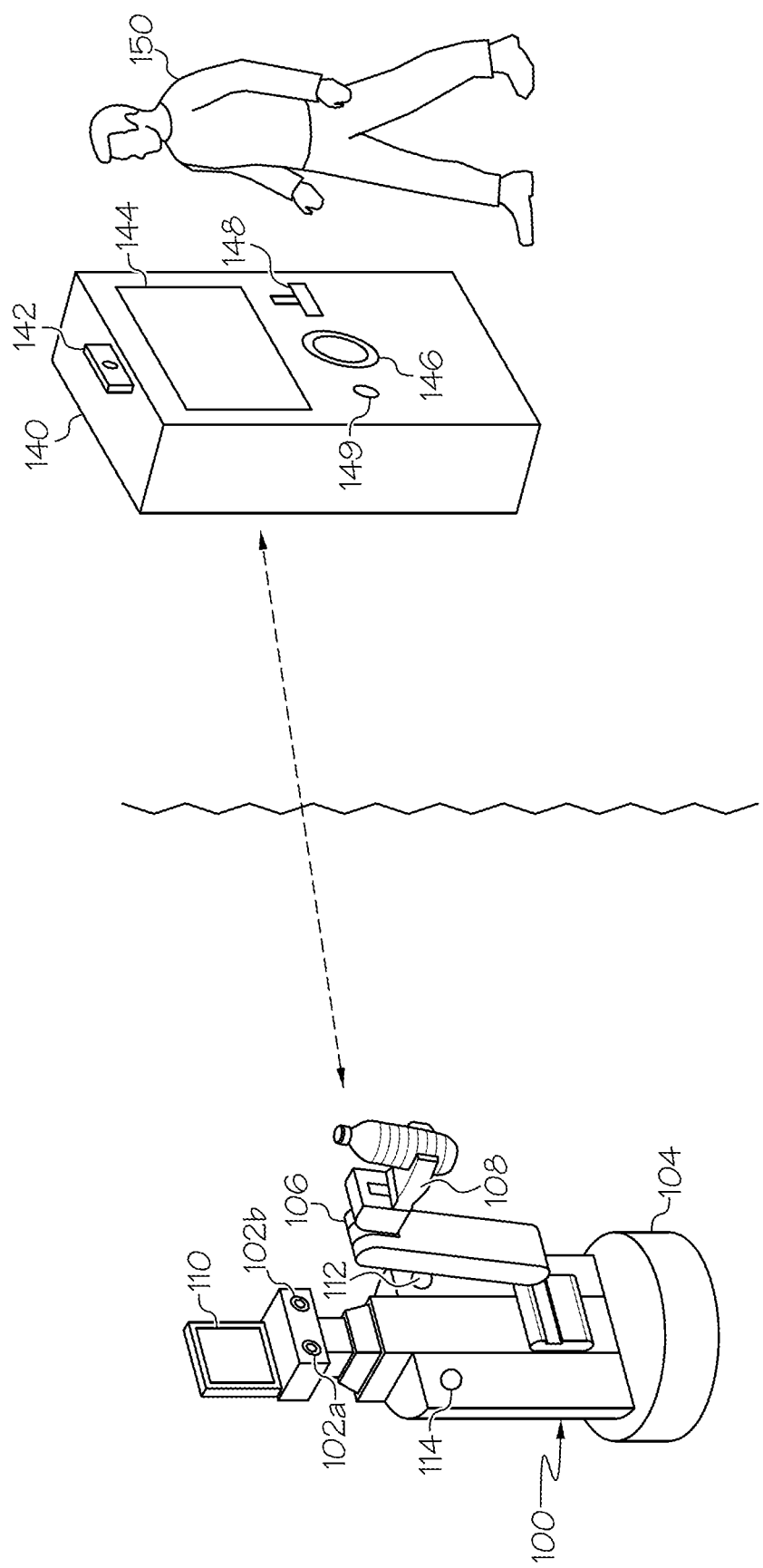
FIG. 1B schematically depicts a robot interacting with a remote user, according to one or more embodiments described and illustrated herein.

FIG. 1B depicts a robot 100 interacting with a remote user via a remote computing device 140. For example, the robot 100 is interacting with user C 150 who is located at a remote location from the robot 100. The robot 100 may communicate with the remote computing device 140 through wireless communication which will be described in detail with reference to FIG. 2. The remote computing device 140 may include one or more image capturing devices 142, a screen 144, a microphone 146, a user interface 148, and a speaker 149.

The one or more image capturing devices 142 may be configured as digital cameras capable of acquiring still image and/or digital video. The one or more image capturing devices 142 depicted in FIG. 1B may enable the robot 100 to detect users, and recognize users, as described below.

The screen 144 may display images, videos, texts, etc. which are visible to users proximate to the robot 100. In embodiments, the screen 144 may display views related to the robot 100. For example, the screen 144 may display the overhead view of the robot 100 such that the user C 150 may see the robot 100 and its surrounding. As another, the screen 144 may display the view of the image capturing devices 102a and 102b of the robot 100 such that the user C 150 may view what the robot 100 is currently viewing. The type of view (e.g., an overhead view, a robot's direct view, etc.) may be determined based on an individual profile for the user C 150.

The microphone 146 may record audio external to the remote computing device 140, e.g., voice by user C 150. In some embodiments, a user may interact with the robot 100 using a user interface 148. The user interface 148 may be an input device configured to receive instructions from a user for operating the robot 100. For example, the input device may be a joystick that the user can manipulate to operate the robot 100. The user may control the moving direction and speed of the robot 100 by controlling the joystick. In response to the operation on the user interface 148, the remote computing device 140 sends instructions to the robot 100, which will be described below with reference to FIG. 2.

In some embodiments, the user C 150 may wear a virtual reality device (e.g., a virtual reality headset) that is communicatively coupled to the remote computing device 140. The virtual reality device may provide haptic feedback to the user C 150 based on instructions from the remote computing device 140. For example, when the robot 100 contacts an obstacle, the robot 100 transmits a signal indicating the contact to the remote computing device 140. The remote computing device 140 instructs the virtual reality device to vibrate in response to receiving the signal indicating the contact.

Figure 2:
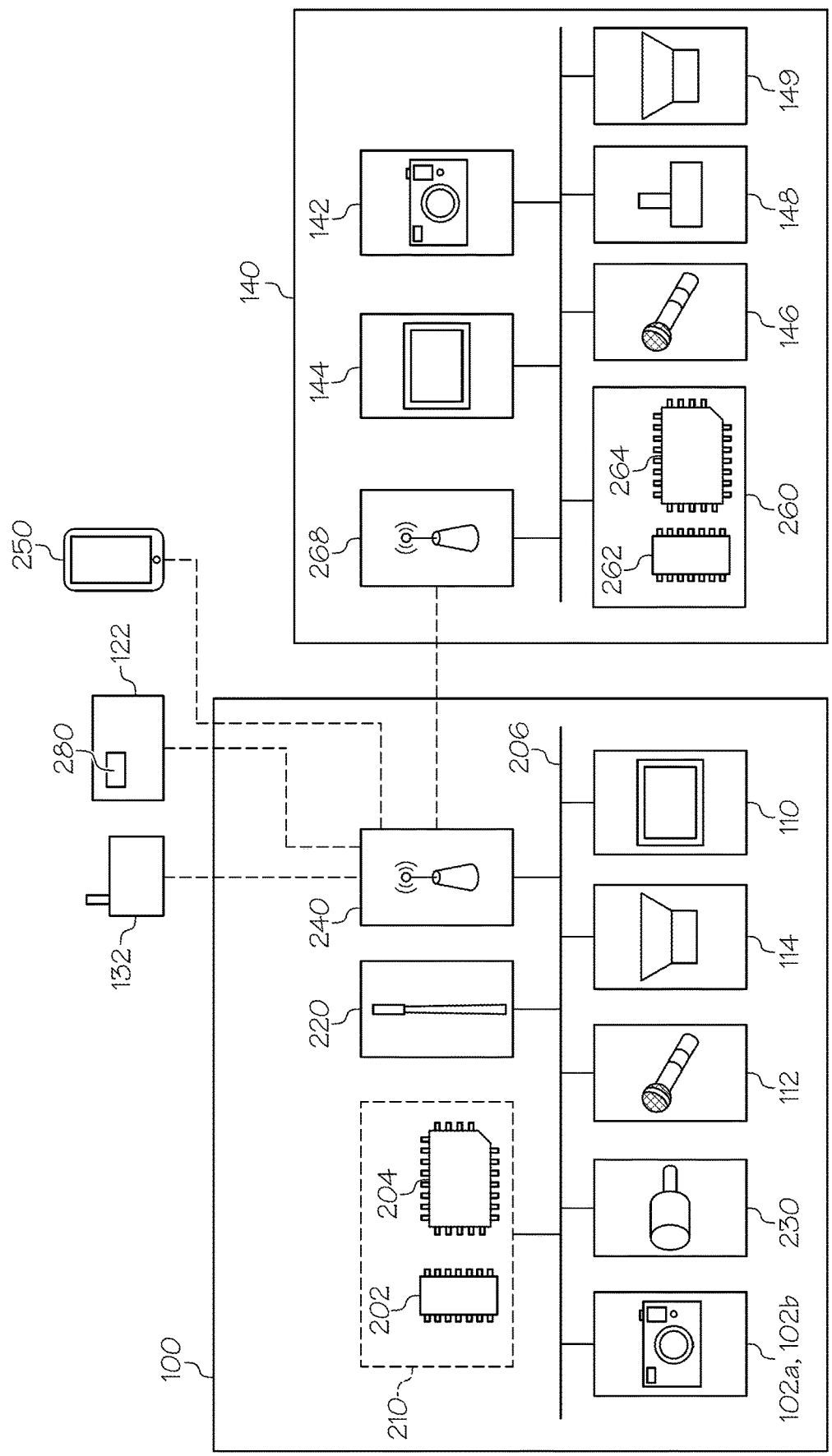
FIG. 2 schematically depicts a robot, according to one or more embodiments described and illustrated herein.

Referring now to FIG. 2, various internal components of the robot 100 are illustrated. The robot 100 includes a controller 210 that includes one or more processors 202 and one or more memory modules 204, the image capturing devices 102a, 102b, a satellite antenna 220, actuator drive hardware 230, network interface hardware 240, the screen 110, the microphone 112, and a speaker 114. In some embodiments, the one or more processors 202, and the one or more memory modules 204 may be provided in a single integrated circuit (e.g., a system on a chip). In some embodiments, the one or more processors 202, and the one or more memory modules 204 may be provided as separate integrated circuits.

Each of the one or more processors 202 is configured to communicate with electrically coupled components, and may be configured as any commercially available or customized processor suitable for the particular applications that the robot 100 is designed to operate. Each of the one or more processors 202 may be any device capable of executing machine readable instructions. Accordingly, each of the one or more processors 202 may be a controller, an integrated circuit, a microchip, a computer, or any other computing device. The one or more processors 202 are coupled to a communication path 206 that provides signal interconnectivity between various modules of the robot 100. The communication path 206 may communicatively couple any number of processors with one another, and allow the modules coupled to the communication path 206 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 206 may be formed from any medium that is capable of transmitting a signal such as, for example, conductive wires, conductive traces, optical waveguides, or the like. Moreover, the communication path 206 may be formed from a combination of mediums capable of transmitting signals. In one embodiment, the communication path 206 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules 204 may be coupled to the communication path 206. The one or more memory modules 204 may include a volatile and/or nonvolatile computer-readable storage medium, such as RAM, ROM, flash memories, hard drives, or any medium capable of storing machine readable instructions such that the machine readable instructions can be accessed by the one or more processors 202. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, user-oriented programming (OOP), scripting languages, microcode, etc., that may be compiled or assembled into machine readable instructions and stored on the one or more memory modules 204. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 204 may be configured to store one or more modules, each of which includes the set of instructions that, when executed by the one or more processors 202, cause the robot 100 to carry out the functionality of the module described herein. For example, the one or more memory modules 204 may be configured to store a robot operating module, including, but not limited to, the set of instructions that, when executed by the one or more processors 202, cause the robot 100 to carry out general robot operations. Furthermore, the one or more memory modules 204 may be configured to store a face recognition module, an action recognition module, and individual profiles for users, the details of which is described below with reference to FIG. 3. It should be understood that in some embodiments, the one or more memory modules 204 may be configured to store only a subset of the face recognition module, the action recognition module, and individual profiles for users. Other data may be stored in the one or more memory modules 204 to provide support for functionalities described herein.

The image capturing devices 102a, 102b may be coupled to the communication path 206. The image capturing devices 102a, 102b may receive control signals from the one or more processors 202 to acquire image data of a surrounding operating space, and to send the acquired image data to the one or more processors 202 and/or the one or more memory modules 204 for processing and/or storage. The image capturing devices 102a, 102b may be directly connected to the one or more memory modules 204, or, in an alternative embodiment, include dedicated memory devices (e.g., flash memory) that are accessible to the one or more processors 202 for retrieval.

Each of the image capturing devices 102a, 102b may have any suitable resolution and may be configured to detect radiation in any desirable wavelength band, such as an ultraviolet wavelength band, a near-ultraviolet wavelength band, a visible light wavelength band, a near infrared wavelength band, or an infrared wavelength band. In some embodiments, at least one of the image capturing devices 102a, 102b may be a standard definition (e.g., 640 pixels× 480 pixels) camera. In some embodiments, at least one of the image capturing devices 102a, 102b may be a high definition camera (e.g., 1440 pixels×1024 pixels or 1280 pixels×1024 pixels). In some embodiments, at least one of the image capturing devices 102a, 102b may have a resolution other than 640 pixels×480 pixels, 1440 pixels×1024 pixels, or 1280 pixels×1024 pixels. The image capturing devices 102a, 102b may provide image data in the form of digital video and/or one or more digital photographs.

The robot 100 includes a satellite antenna 220 coupled to the communication path 206 such that the communication path 206 communicatively couples the satellite antenna 220 to other modules of the robot 100. The satellite antenna 220 is configured to receive signals from global positioning system satellites. Specifically, in one embodiment, the satellite antenna 220 includes one or more conductive elements that interact with electromagnetic signals transmitted by global positioning system satellites. The received signal is transformed into a data signal indicative of the location (e.g., latitude and longitude) of the satellite antenna 220 or a user positioned near the satellite antenna 220, by the one or more processors 202. In some embodiments, the robot 100 may not include the satellite antenna 220.

The actuator drive hardware 230 may comprise the actuators and associated drive electronics to control the locomotion device 104, the arm 106, the gripping assembly 108, and any other external components that may be present in the robot 100. The actuator drive hardware 230 may be configured to receive control signals from the one or more processors 202 and to operate the robot 100 accordingly. The operating parameters and/or gains for the actuator drive hardware 230 may be stored in the one or more memory modules 204. The operating parameters and/or gains for the actuator drive hardware 230 may be adjusted based on individual profiles stored in the one or more memory modules 204. For example, one or more drive gain parameters for controlling the locomotion device 104 may be adjusted according to different drive gain parameters in the individual profiles. Specifically, when user A 120 is identified by the robot 100, drive gain parameters in the individual profile for user A are retrieved, and the one or more drive gain parameters for controlling the locomotion device 104 may be adjusted according to the retrieved drive gain parameters. As another example, a drive gain parameter, a torque, and/or any other parameters for controlling the arm 106 and the gripping assembly 108 may be adjusted according to different drive gain parameters, torques, and/or any other parameters in the individual profiles. Specifically, when user B 130 is identified by the robot 100, drive gain parameters, torques, and/or any other parameters in the individual profile for user B are retrieved, and the drive gain parameters, torques, and/or any other parameters for controlling the arm 106 and the gripping assembly 108 may be adjusted according to the retrieved drive gain parameters, torques, and/or any other parameters.

The robot 100 includes the network interface hardware 240 for communicatively coupling the robot 100 with a mobile device 250, a remote computing device 140, the wearable device 122, and the user interface 132. The mobile device 250 or the remote computing device 140 may authenticate itself before it initiates communication with the robot 100 through the network interface hardware 240. The display of the mobile device 250 or the remote computing device 140 may display information to the user of the mobile device 250 or the remote computing device, e.g., the view that the robot is seeing with its cameras, a map of a room or building that the robot is in, the path of the robot, or a highlight of an object to be grasped. The network interface hardware 240 may be coupled to the communication path 206 and may be configured as a wireless communications circuit such that the robot 100 may communicate with external systems and devices. The network interface hardware 240 may include a communication transceiver for sending and/or receiving data according to any wireless communication standard. For example, the network interface hardware 240 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 240 includes a Bluetooth transceiver that enables the robot 100 to exchange information with the mobile device 250 (e.g., a smartphone) via Bluetooth communication. In some embodiments, the robot 100 may not include the network interface hardware 240.

The network interface hardware 240 may receive motion data from one or more motion sensors 280 of the wearable device 122. The one or more motion sensors 280 may include inertial measurement units. Each of the one or more motion sensors 280 may include one or more accelerometers and one or more gyroscopes. Each of the one or more motion sensors 280 transforms sensed physical movement of the wearable device 122 into a signal indicative of an orientation, a rotation, a velocity, or an acceleration of the wearable device 122. Some embodiments of the wearable device 122 may include an accelerometer but not a gyroscope, or may include a gyroscope but not an accelerometer.

In some embodiments, the network interface hardware 240 may receive operating instructions from the user interface 132. For example, the robot 100 may receive instruction on moving speed and direction of the robot 100 from the user interface 132 and operate the actuator drive hardware 230 based on the received speed and direction. As another example, the robot 100 may receive instructions on operations of the arm 106 and operates the arm 106 based on the received instruction.

The robot 100 includes the screen 110 coupled to the communication path 206 such that the communication path 206 communicatively couples the screen 110 to other modules of the robot 100. The screen 110 may display information about identified user that the robot 100 is currently interacting with in response to the identification of the user. For example, the screen 110 of the robot 100 may receive a picture of the user captured by the image capturing devices 102a, 102b and display the picture of the user. As another example, the screen 110 of the robot 100 may display the name of the identified user, which may be retrieved from the individual profile for the identified user. In some embodiments, information about a user who remotely operates the robot 100 may be output on the screen 110. For example, in FIG. 1B, a live image of user C 150 may be transmitted from the remote computing device 140 to the robot 100, and the screen 110 of the robot 100 displays the live image of user C 150. As another example, a static phot or a textual name card of user C 150 may be displayed on the screen 110 of the robot 100. The content of identification information may be determined based on the individual profile for the identified user.

The robot 100 includes the microphone 112 coupled to the communication path 206 such that the communication path 206 communicatively couples the microphone 112 to other modules of the robot 100. The microphone 112 may be configured for receiving user voice commands and/or other inputs to the robot 100. The microphone 112 transforms acoustic vibrations received by the microphone 112 into a speech input signal. As will be described in further detail below, the one or more processors 202 may process the speech input signals received from the microphone 112 to identify the user from which the acoustic vibrations are originated. In some embodiments, the robot 100 may not include the microphone 112.

The robot 100 includes the speaker 114 coupled to the communication path 206 such that the communication path 206 communicatively couples the speaker 114 to other modules of the robot 100. The speaker 114 transforms data signals into audible mechanical vibrations. The speaker 114 outputs audible sound such that a user proximate to the robot 100 may interact with the robot 100.

The remote computing device 140 includes a controller 260 that includes one or more processors 262 and one or more memory modules 264, the one or more image capturing devices 142, network interface hardware 268, the screen 144, the microphone 146, the user interface 148, and a speaker 149. The one or more processors 262, one or more memory modules 264, the one or more image capturing devices 142, network interface hardware 268, the screen 144, the microphone 146, and the user interface 148 may be components similar to the one or more processors 202, one or more memory modules 204, the image capturing devices 102a, 102b, the network interface hardware 240, the screen 110, the microphone 112, the speaker 114 and the user interface 132 described above.

Figure 3:
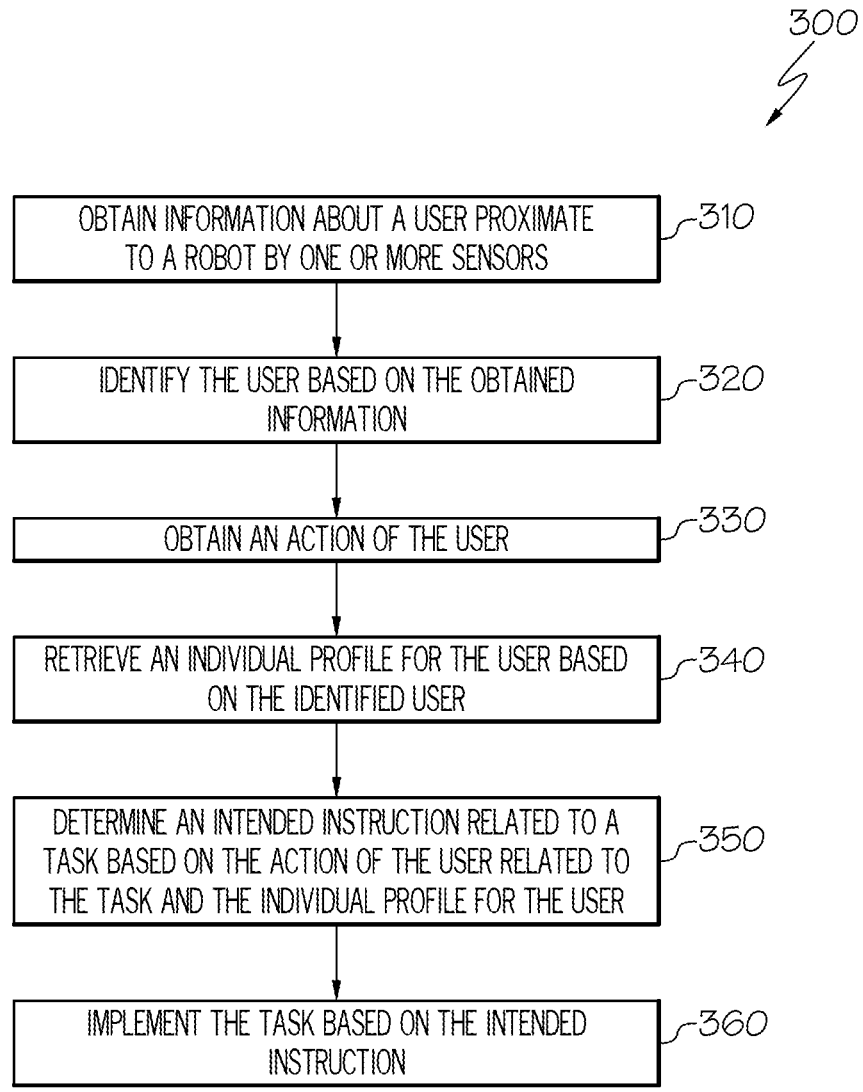
FIG. 3 schematically depicts a flowchart of a method of implementing a task required by a user, according to one or more embodiments described and illustrated herein.

Referring now to FIG. 3, a flowchart of a method 300 of implementing a task requested by a user is schematically depicted. In some embodiments, the method 300 may be implemented as logic within the machine readable instructions that, when executed by the one or more processors 202, obtain information about a user (e.g., a person, or another robot) proximate to the robot with the one or more sensors, identify the user based on the obtained information, obtain an action of the user, retrieve an individual profile for the user based on the identified user, determine an intended instruction related to a task based on the action of the user related to the task and the individual profile for the user, and implement the task based on the intended instruction. It is noted that, while the method 300 depicts a specific sequence, additional embodiments of the present disclosure are not limited to any particular sequence.

Referring now to FIG. 3, at block 310, the robot 100 obtains information about a user proximate to the robot 100 with one or more sensors. One or more sensors may include the image capturing devices 102a, 102b, and/or the microphone 112. For example, the robot 100 may receive image data representative of the operating space 101 including user A 120 or user B 130 as shown in FIG. 1A. As noted above, in some embodiments, the robot 100 operates within the operating space 101 and is configured to acquire image data of the operating space 101 from the image capturing devices 102a, 102b, and to then send the acquired image data of the operating space 101 to the one or more processors 202 and/or the one or more memory modules 204 for storage and/or processing. In some embodiments, the robot 100 may receive image data from a source external to the robot 100 (e.g., the mobile device 250 or the remote computing device 140), such as via the network interface hardware 240.

The image data received at block 310 may be data of a variety of forms, such as, but not limited to red-green-blue ("RGB") data, depth image data, three dimensional ("3D") point data, and the like. In some embodiments, the robot 100 may receive depth image data from an infrared sensor or other depth sensor, such as an infrared sensor or depth sensor integrated with the image capturing devices 102a, 102b. In other embodiments that include a depth sensor (e.g., an infrared sensor), the depth sensor may be separate from the image capturing devices 102a, 102b.

In some embodiments, the robot 100 may receive audio data from user A 120 or user B 130. As noted above, in some embodiments, the robot 100 operates within an operating space 101 and is configured to acquire the audio data from the microphone 112, and to then send the acquired audio data of the operating space 101 to the one or more processors 202 and/or the one or more memory modules 204 for storage and/or processing.

In some embodiments, the robot 100 may receive information about a user proximate to the robot 100 from the mobile device 250 or the remote computing device 140. For example, a user may log in to the robot 100 using the mobile device 250. Specifically, a username and a password are transmitted from the mobile device 250 or the remote computing device 140 to the controller 210 via the network interface hardware 240.

Still referring to FIG. 3, at block 320, the robot 100 identifies the user based on the obtained information. In embodiments, the one or more processors 202 may implement face recognition algorithms on the captured images to identify the user. One or more face algorithm modules may be stored in the one or more memory modules 204, and implanted by the one or more processors 202. Any known face recognition algorithms may be used to identify the user.

In some embodiments, the robot 100 identifies the user based on the acquired audio data from the microphone 112. For example, the one or more processors 202 receive the acquired audio data from the microphone 112 and compare the acquired data with samples stored in the one or more memory modules 204. The one or more processors 202 may extract the features of the acquired audio data, e.g., a frequency, an amplitude, an intonation, etc., and compare the extracted features with the features of samples to identify the user who generated the audio.

In some embodiments, the robot 100 identifies the user based on the information received from the mobile device 250 or the remote computing device 140. For example, in FIG. 1B, a user types a username and a password into the remote computing device 140. The remote computing device 140 transmits the information about the user name and password to the robot 100. The robot 100 may identify the user based on the received username and password.

In some embodiments, the screen 110 of the robot 100 may display information about the identified user that the robot 100 is currently interacting with in response to the identification of the user. For example, the screen 110 of the robot 100 may display the picture of the identified user. As another example, the screen 110 of the robot 100 may display the name of the identified user, which may be retrieved from the individual profile for the identified user.

Still referring to FIG. 3, at block 330, the robot 100 obtains an action of the user. In embodiments, the robot 100 may capture the movements of the user using the image capturing devices 102a and 102b. For example, the robot 100 may capture videos of the user and analyze the video to obtain the action of the user. Specifically, the one or more processors 202 may receive the captured video and process the video to identify the action of the user, e.g., shaking hands, shaking a head, pointing an object with an index finger, lowering or raising a hand, etc. One or more action recognition modules may be stored in the one or more memory modules 204, and implanted by the one or more processors 202.

In some embodiments, the robot 100 may receive motion data from the wearable device 122 worn by a user. For example, the robot 100 may receive motion information about an orientation, a rotation, a velocity, and/or an acceleration of the wearable device 122 sensed by the one or more motion sensors 280. In some embodiments, the robot 100 may receive operation instructions from the user interface 132. For example, the robot 100 may receive data related to the movement of a joystick (e.g., an orientation and/or tilt angle of the joystick) of the user interface 132.

Still referring to FIG. 3, at block 340, the robot 100 retrieves an individual profile for the user based on the identified user. In embodiments, the one or more memory modules 204 may store individual profiles for various users. The various users may be pre-registered to the robot 100, and individual profiles for the pre-registered users may be stored in the one or more memory modules 204 of the robot 100. Each of the individual profiles may store various individualized data for the users. For example, each of the individual profiles may store gains and parameters that adjust the maximum speed of the movement of the robot 100, or maximum torque or force that the robot 100 may apply.

In some embodiments, each of the individual profiles may store workspace scaling values. The workspace scaling values represent a ratio between the movement of a user and the movement of the robot. For example, an individual profile for user A stores a workspace scaling value indicating that a ratio of user's movement to the robot's movement is 5 to 1 (i.e., a user moves her arm 5 inches and the robot moves its arm 1 inch in response to the user's movement). An individual profile for user B stores a workspace scaling value indicating that a ratio of user's movement to the robot's movement is 1 to 5 (i.e., a user moves her arm 1 inch in a certain direction and the robot moves its arm 5 inches in the direction in response to the user's movement).

In some embodiments each of the individual profiles may store a preferred view. For example, a profile for user A may indicate that the user A prefers an overhead view of the robot 100 when the user A remotely operates the robot 100. As another example, a profile for user B may indicate that the user B prefers to viewing from the robot's perspective when the user B remotely operates the robot 100.

In some embodiments each of the individual profiles may store a preferred feedback format. For example, a profile for user A may indicate that the user A prefers a slight haptic feedback through a joystick when the robot that the user A is interacting with bumps into an obstacle. As another example, a profile for user B may indicate that the user B prefers an audible feedback through a speaker when the robot that the user B is interacting with bumps into an obstacle.

In some embodiments, individual profiles may store user intent parameters. For example, a profile for user A may indicate that the user A requires precise movements, whereas a profile for user B may indicate that the user B does not require precise movements. As such, when a robot is working for user A, the robot operates accurately (e.g., placing a cup at the right location designated by the user A). When a robot is working for user B, the robot compromises accuracy of movement, but operates faster (e.g., it does not spend much time in order to place a cup at the exact position).

In some embodiments, the individual profiles may store actions in association with user's intentions. For example, a profile for user A may store an action of thumbs-down as related to disapproval, and a profile for user B may store an action of shaking her head as related to disapproval. When a robot is working for user A and user A makes a thumbs-down gesture, the robot interprets that user A does not approve the action that the robot is going to initiate. Similarly, when a robot is working for user B and user B shakes her head, the robot interprets that the user B does not approve the action that the robot is going to initiate.

In some embodiments, the gains, parameters, workspace scaling values, and other values may be manually set and/or adjusted by users. For example, a user may operate the robot 100 by moving his arm wearing the wearable device 122 or manipulating the joystick of the user interface 132, and adjust the sensitivity of movement of the robot 100 by adjusting the gains, parameters, and/or workspace scaling values for operating the robot 100.

In some embodiments, the individual profiles may be stored remotely, and the robot 100 may receive the stored individual profiles from an external device through the network interface hardware 240.

Still referring to FIG. 3, at block 350, the robot 100 determines an intended instruction related to a task based on the action of the user related to the task and the individual profile for the user. For example, the robot 100 may identify a user proximate to the robot 100 as user C and obtain user C's action of pointing an index finger at a bottle by processing images captured by the image capturing devices 102a and 102b. The individual profile for user C stores interpretation of gestures of user C, for example, interpreting the action of pointing the index finger at an object as an instruction for moving toward the user. The individual profile for user C may also include the speed of the robot, e.g., 0.1 meter/second. Based on the user C's pointing with the index finger and the individual profile for user C, the robot 100 determines that user C is instructing the robot 100 to move to the bottle at the speed of 0.1 meter/second. As another example, the robot 100 may identify a user proximate to the robot 100 as user D and obtain user D's action of pointing an index finger at a bottle by processing images from the image capturing devices 102a and 102b. The individual profile for user D stores interpretation of gestures of user D, for example, interpreting the action of pointing the index finger at a user as an instruction for picking up the user. The individual profile for user D may also include the speed of the robot, e.g., 0.2 meter/second. Based on the user D's pointing with the index finger and the individual profile for user D, the robot 100 determines that user D is instructing the robot 100 to move toward the bottle at the speed of 0.2 meter/second and pick up the bottle.

In some embodiments, the screen 110 of the robot 100 may display information about the task that the robot 100 is currently implementing in response to determining the intended instruction. For example, the screen 110 of the robot 100 may display text describing the task that the robot 100 is currently implementing, e.g., "Picking up a water bottle." In some embodiments, the display of the mobile device 250 or the remote computing device 140 may display information about the task the robot 100 is currently implanting.

Still referring to FIG. 3, at block 360, the robot 100 implements the task based on the intended instruction. For example, in response to the determination that user C is instructing the robot 100 to move to the bottle at the speed of 0.1 meter/second, the robot 100 moves toward the bottle at the speed of 0.1 meter/second. As another example, in response to the determination that user D is instructing the robot 100 to pick up the bottle, the robot 100 moves toward the bottle at the speed of 0.2 meter/second and picks up the bottle.

Figure 4A:
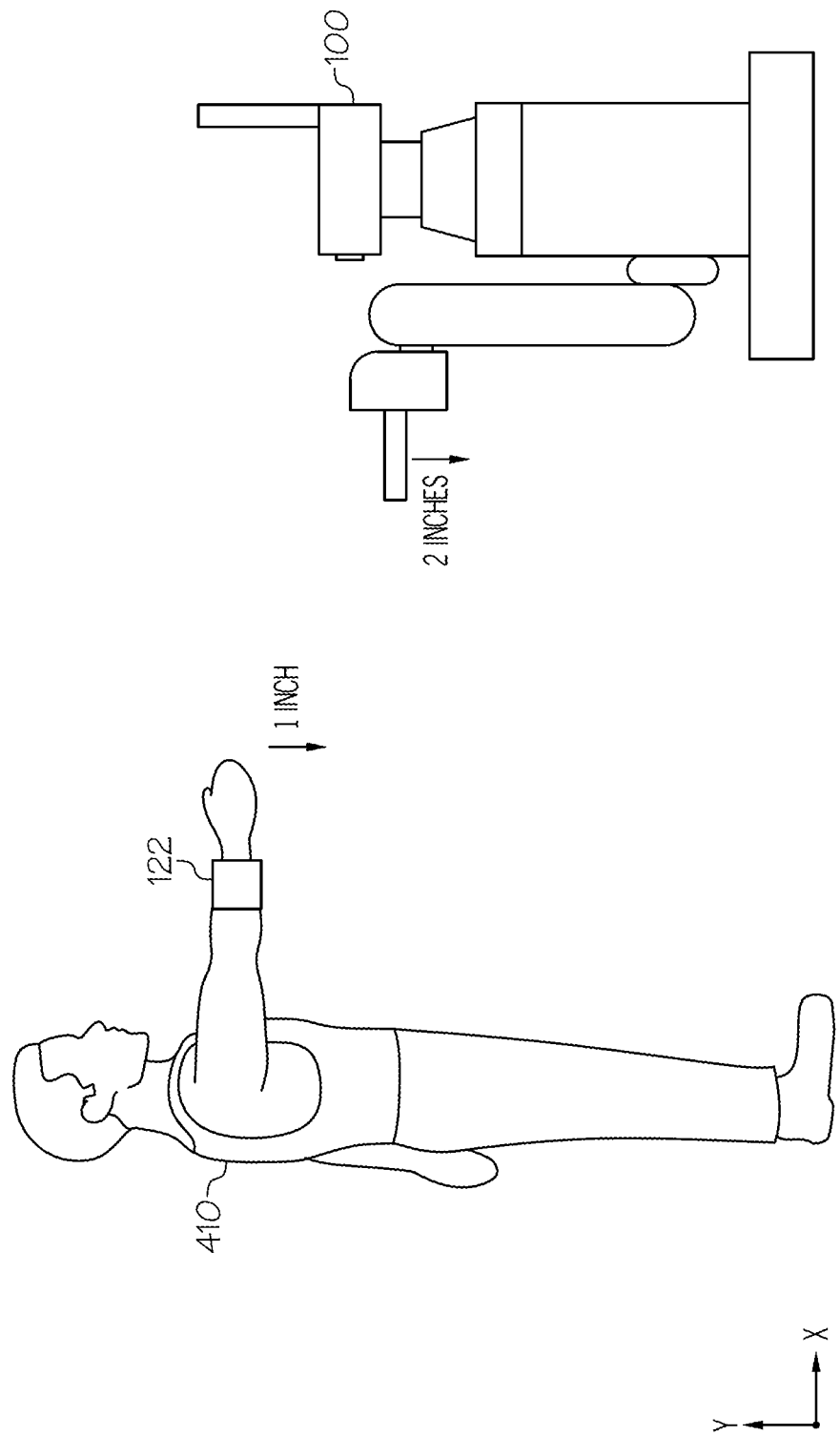
FIG. 4A depicts a robot operating based on a workspace scaling value for a user, according to one or more embodiments described and illustrated herein.
Figure 4B:
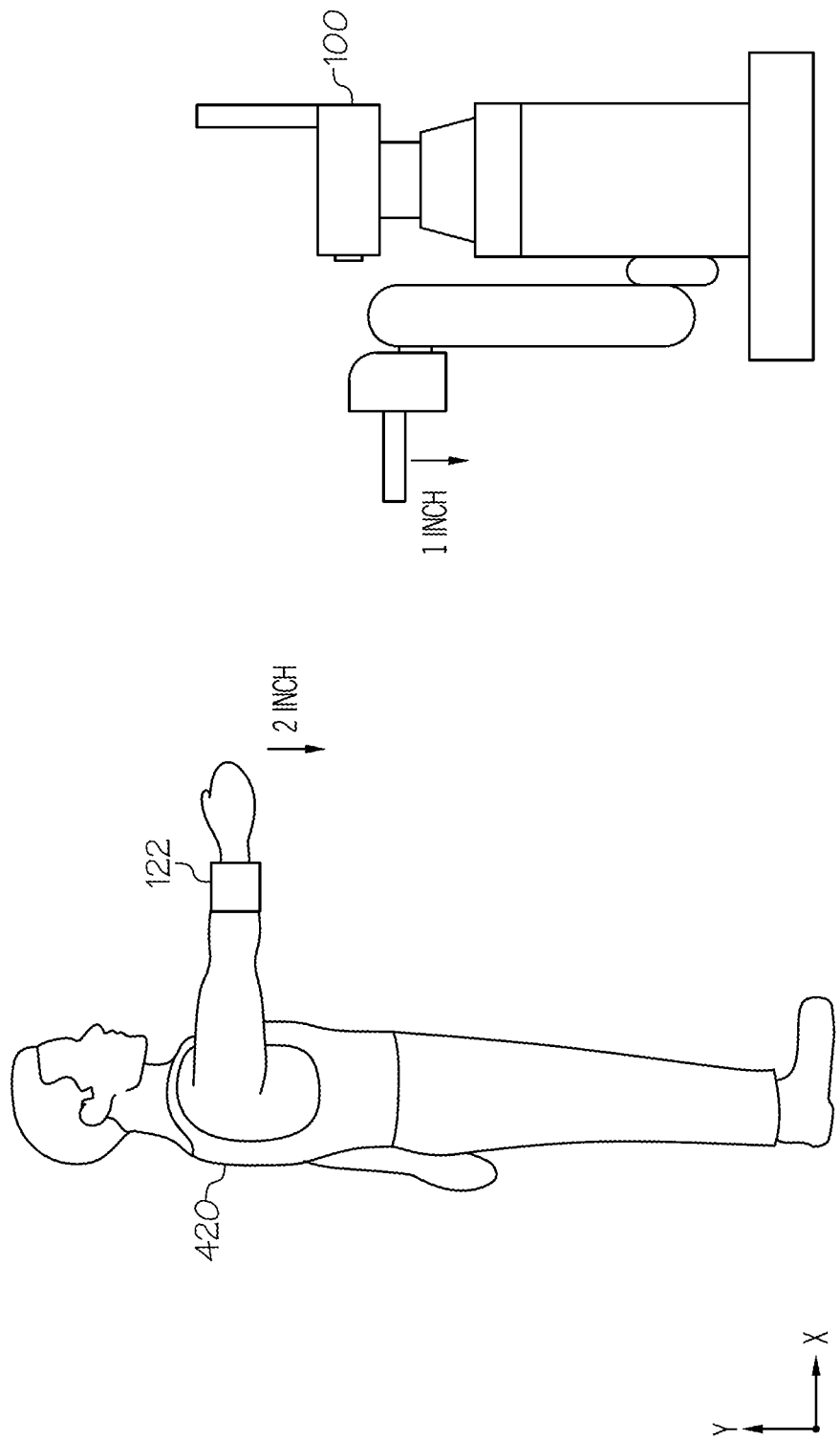
FIG. 4B depicts a robot operating based on a workspace scaling value for another user, according to one or more embodiments described and illustrated herein.

FIGS. 4A and 4B depict operations of the robot 100 based on individual profiles including workspace scaling values, according to one or more embodiments shown and described herein. In FIG. 4A, the robot 100 identifies the user 410 and retrieves the individual profile for the user 410. The individual profile for user 410 may include a workspace scaling value of 1 to 2. That is, the ratio of the movement of the user 410 and the movement of the robot 100 is 1 to 2. The wearable device 122 on the arm of the user 410 monitors the movement of the arm and transmits the movement information to the robot 100. For example, when the user 410 lowers his arm by one inch, the wearable device 122 transmits the dislocation information (e.g., moving 1 inch toward—y direction) to the robot 100. Based on the dislocation of the arm of the user 410 and the individual profile for user 410, the robot 100 moves its arm in—y direction by two inches.

In some embodiments, the user 410 may not wear the wearable device 122. The robot 100 may capture images of the user 410 with the image capturing devices 102a and 102b, and process the images to determine the dislocation of the arm of the user 410. Based on the determined dislocation of the arm of the user 410 and the individual profile for user 410, the robot 100 moves its arm in—y direction by two inches.

In FIG. 4B, the robot 100 identifies the user 420 and retrieves the individual profile for the user 420. The individual profile for user 420 may include a workspace scaling value of 2 to 1. That is, the ratio of the movement of the user 420 and the movement of the robot 100 is 2 to 1. The wearable device 122 on the arm of the user 420 monitors the movement of the arm and transmits the movement information to the robot 100. For example, when the user 420 lowers his arm by two inches, the wearable device 122 transmits the dislocation information (e.g., moving 2 inches toward—y direction) to the robot 100. Based on the dislocation of the arm of the user 420 and the individual profile for user 420, the robot 100 moves its arm in—y direction by one inch. In some embodiments, the user 420 may not wear the wearable device 122. The robot 100 may capture images of the user 420 by the image capturing devices 102a and 102b, and process the images to determine the dislocation of the arm of the user 420.

Figure 5A:
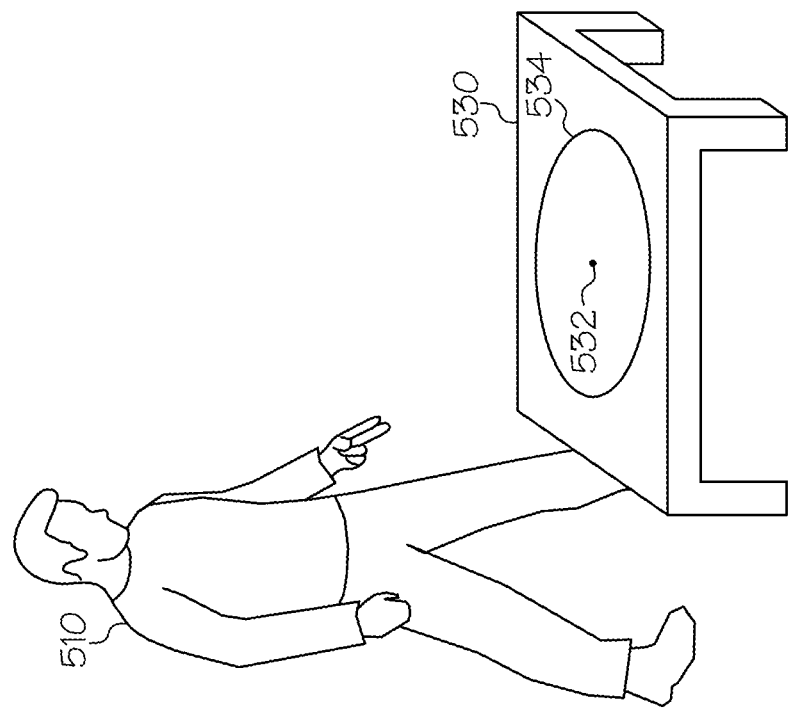
FIG. 5A depicts a robot interpreting an intended instruction of a user and operating based on the intended instruction, according to one or more embodiments described and illustrated herein.
Figure 5A:
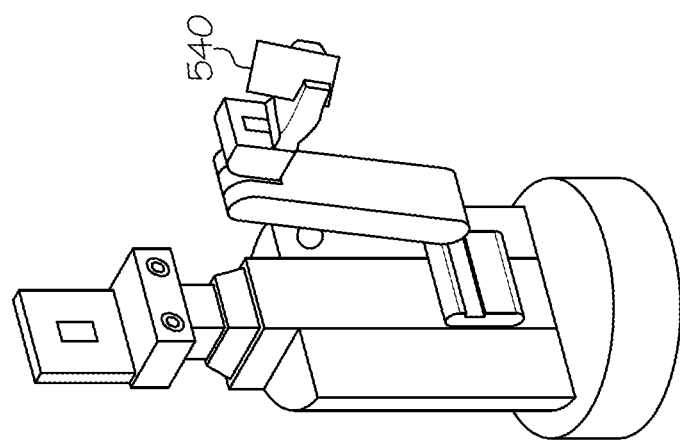
Figure 5B:
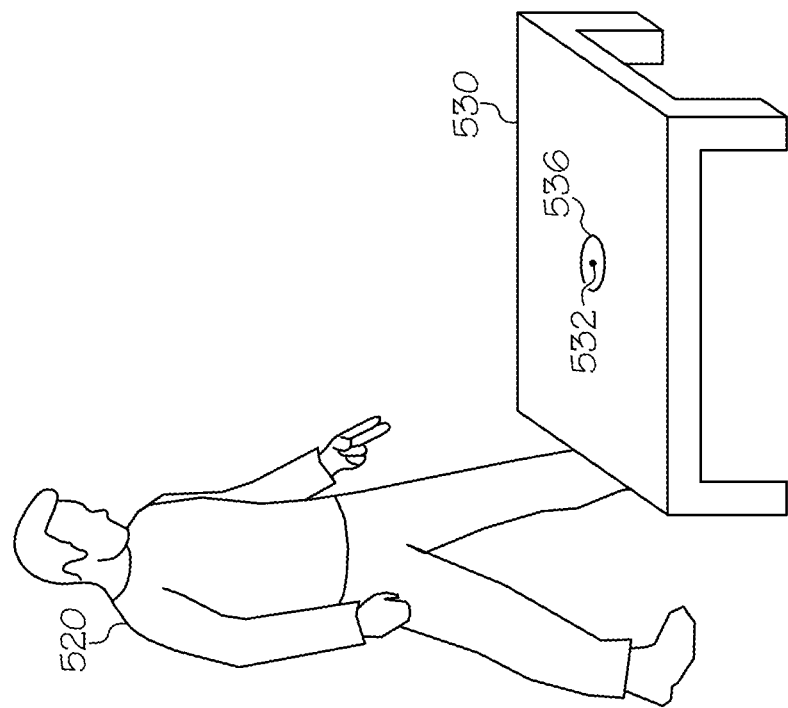
FIG. 5B depicts a robot interpreting an intended instruction of another user and operating based on the intended instruction, according to one or more embodiments described and illustrated herein.
Figure 5B:
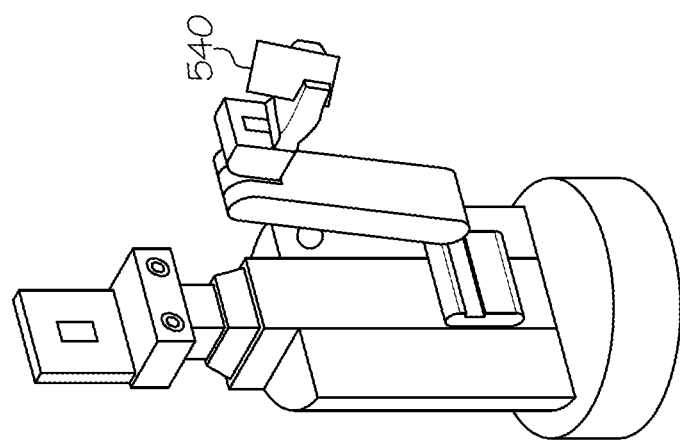

FIGS. 5A and 5B depict operating of the robot based on individual profiles, according to embodiments shown and described herein. In FIG. 5A, the robot 100 is holding an object 540 (e.g., a water bottle). The robot 100 identifies the user 510 and obtains the action of the user 510, e.g., the action of pointing at a point 532 on a table 530 with two fingers. The robot 100 retrieves the individual profile for the user 510. The individual profile for the user 510 may include mapping the action of pointing with two fingers to an instruction for putting down an object at the pointed location. The individual profile for the user 510 also includes a maximum allowance deviation from the pointed location, e.g., 10 inches from the point 532. The area 534 illustrates an area where the robot 100 is allowed to put down the object 540 based on the maximum allowance deviation. Based on the action of pointing at the point 532 with two fingers and the individual profile for user 510, the robot 100 moves toward the table 530 and puts the object 540 any location within the area 534.

In FIG. 5B, the robot 100 is holding an object 540 (e.g., a water bottle). The robot 100 identifies the user 520 and obtains the action of the user 520, e.g., the action of pointing at a point 532 on the table 530 with two fingers. The robot 100 retrieves the individual profile for the user 520. The individual profile for the user 520 may include mapping an action of pointing with two fingers to an instruction for putting down an object at the pointed location. The individual profile for the user 520 also includes a maximum allowance deviation from the pointed location, e.g., 0.5 inches from the point 532. The area 536 illustrates an area where the robot 100 is allowed to put down the object 540. Based on the action of pointing at the point 532 with two fingers and the individual profile for user 520, the robot 100 moves toward the table 530 and puts the object 540 within the area 536. As such, when the robot 100 is interacting with user 520, the robot 100 may implement the task with more precision (e.g., putting an object at the right position) compared to when interacting with the user 510. In contrast with the user 520, when the robot is interacting with the user 510, the robot 100 may complete the task more quickly than when interacting with the user 520 because the individual profile for the user 510 allows greater deviation.

It should now be understood that obtaining, by one or more sensors of a remote computing device, information about a user proximate to the remote computing device; identifying, by a controller of the remote computing device, the user based on the obtained information; obtaining, by the controller, an action of the user; retrieving, by the controller, an individual profile for the user based on the identified user; determining, by the controller of the remote computing device, an intended instruction related to a task based on the action of the user related to the task and the individual profile for the user; and instructing, by the controller of the remote computing device, the robot to implement the task based on the intended instruction, may provide for customized task implementation for different users. Adjusting operating gains, parameters, and/or workspace scaling values of a robot system according to individual profiles may provide for enhanced interaction experience with robot systems. Furthermore, different maximum allowance deviations for a certain task may also enhance human-robot interaction experiences.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A teleoperation system comprising:
a robot comprising an actuator configured to move at least a portion of the robot; and
a remote computing device configured to:
obtain information about a user proximate to the remote computing device with one or more sensors;
identify the user based on the obtained information;
obtain an action of the user;
retrieve an individual profile among a plurality of profiles based on the identified user, each of the plurality of profiles including intended instructions associated with corresponding actions;
determine an intended instruction related to a task by interpreting the action of the user related to the task based on the intended instruction associated with the action of the user; and
instruct the robot to implement the task with the actuator based on the intended instruction,
wherein the individual profile includes intent parameters related to the action of the user, and
wherein the individual profile includes a first maximum allowable deviation for implementing the task that is different from a second maximum allowable deviation included in another individual profile, the first maximum allowable deviation is a maximum deviation between a position of an object to be placed by the robot and a position designated by the user, and the robot is instructed to implement the task of placing the object within the first maximum allowable deviation.

2. The teleoperation system of claim 1, wherein the individual profile includes a workspace scaling value.

3. The teleoperation system of claim 2, wherein the robot further comprises an arm,
wherein the remote computing device is configured to cause the robot to operate the arm with the actuator based on the action of the user and the workspace scaling value.

4. The teleoperation system of claim 1, wherein the individual profile includes one or more operating gains of the robot.

5. The teleoperation system of claim 1, wherein the one or more sensors includes one or more imaging devices configured to obtain one or more images of the user.

6. The teleoperation system of claim 1, wherein:
the remote computing device comprises an output device configured to provide feedback to the user based on an operation of the robot, and
the remote computing device is configured to determine the feedback based on the individual profile for the user.

7. The teleoperation system of claim 1, wherein:
the remote computing device comprises a display configured to display a view related to the robot, and
the remote computing device is configured to determine a type of the view based on the individual profile for the user.

8. The teleoperation system of claim 1, wherein the remote computing device is configured to identify a location related to the task based on the action of the user, and
implement the task within the first maximum allowable deviation from the location.

9. The teleoperation system of claim 1, further comprising a screen on the remote computing device configured to display information related to the intended instruction.

10. A robot system comprising:
one or more processors;
one or more sensors communicatively coupled to the one or more processors;
a non-transitory memory component communicatively coupled to the one or more processors; and
machine readable instructions stored in the non-transitory memory component that cause the robot system to perform at least the following when executed by the one or more processors:
obtain information about a user proximate to the robot system with the one or more sensors;
identify the user based on the obtained information;
obtain an action of the user;
retrieve an individual profile among a plurality of profiles based on the identified user, each of the plurality of profiles including intended instructions associated with corresponding actions;
determine an intended instruction related to a task by interpreting the action of the user related to the task based on the intended instruction associated with the action of the user; and
implement the task based on the intended instruction,
wherein the individual profile includes intent parameters related to the action of the user, and
wherein the individual profile includes a first maximum allowable deviation for implementing the task that is different from a second maximum allowable deviation included in another individual profile, the first maximum allowable deviation is a maximum deviation between a position of an object to be placed by the robot system and a position designated by the user, and the robot system implements the task of placing the object within the first maximum allowable deviation.

11. The robot system of claim 10, wherein the individual profile includes a workspace scaling value.

12. The robot system of claim 11, further comprising an arm,
wherein the robot system is configured to operate the arm based on the action of the user and the workspace scaling value.

13. The robot system of claim 11, wherein the robot system is configured to receive information on the action of the user from a wearable device.

14. A method for operating a robot, the method comprising:
obtaining, by one or more sensors of a remote computing device, information about a user proximate to the remote computing device;
identifying, by a controller of the remote computing device, the user based on the obtained information;
obtaining, by the controller of the remote computing device, an action of the user;
retrieving, by the controller of the remote computing device, an individual profile for the user among a plurality of profiles based on the identified user, each of the plurality of profiles including intended instructions associated with corresponding actions;
determining, by the controller of the remote computing device, an intended instruction related to a task by interpreting the action of the user related to the task based on the intended instruction associated with the action of the user; and
instructing, by the controller of the remote computing device, the robot to implement the task based on the intended instruction,
wherein the individual profile includes intent parameters related to the action of the user, and
wherein the individual profile includes a first maximum allowable deviation for implementing the task that is different from a second maximum allowable deviation included in another individual profile, the first maximum allowable deviation is a maximum deviation between a position of an object to be placed by the robot and a position designated by the user, and the robot is instructed to implement the task of placing the object within the first maximum allowable deviation.

15. The method of claim 14, wherein the individual profile includes a workspace scaling value.

16. The method of claim 14, wherein the individual profile includes one or more operating gains of the robot.

17. The method of claim 14, wherein the one or more sensors includes one or more imaging devices configured to obtain one or more images of the user.

18. The method of claim 14, further comprising:
identifying a location related to the task based on the action of the user; and
implementing the task within the first maximum allowable deviation from the location.

* * * * *